United States Patent [19]

Bornhorst

[11] Patent Number: 4,779,176
[45] Date of Patent: Oct. 18, 1988

[54] LIGHT PATTERN GENERATOR

[75] Inventor: James M. Bornhorst, Duncanville, Tex.

[73] Assignee: Vari-Lite, Inc., Dallas, Tex.

[21] Appl. No.: 887,368

[22] Filed: Jul. 16, 1986

[51] Int. Cl.$^4$ ............... F21M 21/00; G03B 21/00; G03B 21/14

[52] U.S. Cl. ............... 362/223; 353/62; 353/84; 353/42; 40/560; 362/222; 362/307

[58] Field of Search ............... 362/293, 222, 223, 307, 362/807, 812; 40/560; 353/97, 42, 62, 84

[56] References Cited

U.S. PATENT DOCUMENTS

| | | | |
|---|---|---|---|
| 2,055,217 | 9/1936 | Gauthier | 353/62 X |
| 2,077,111 | 4/1937 | Kent | 353/62 |
| 2,379,534 | 7/1945 | Lowden | 40/560 X |
| 2,498,294 | 2/1950 | Pennom et al. | 353/42 X |
| 2,959,094 | 11/1960 | Kosma | 353/62 X |
| 4,222,641 | 9/1980 | Stolov | 353/84 |

FOREIGN PATENT DOCUMENTS 98572 8/1972 German Democratic Rep. .
1904008 11/1964 Fed. Rep. of Germany .
3235963 9/1982 Fed. Rep. of Germany .
1356430 6/1974 United Kingdom .

Primary Examiner—Larry Jones
Attorney, Agent, or Firm—Richards, Harris, Medlock & Andrews

[57] ABSTRACT

A light pattern generator is utilized to produce an image which is projected onto a stage or screen. The image is derived from a beam of light. The light pattern generator comprises a heat resistant glass plate having a reflective layer deposited on one surface thereof. A nonreflective layer is deposited on the surface of the reflective layer. Both of the layers are etched to produce an opening extending through the layers wherein the opening has the shape of the desired image. The beam of light is directed through the transparent plate and the portions not passed through the opening are reflected by the mirror surface of the reflective layer. This prevents the buildup of heat within the light pattern generator. Any extraneous light which is received at the nonreflective layer is absorbed to prevent the escape of unwanted light and its projection to the stage.

15 Claims, 1 Drawing Sheet

U.S. Patent    Oct. 18, 1988    4,779,176
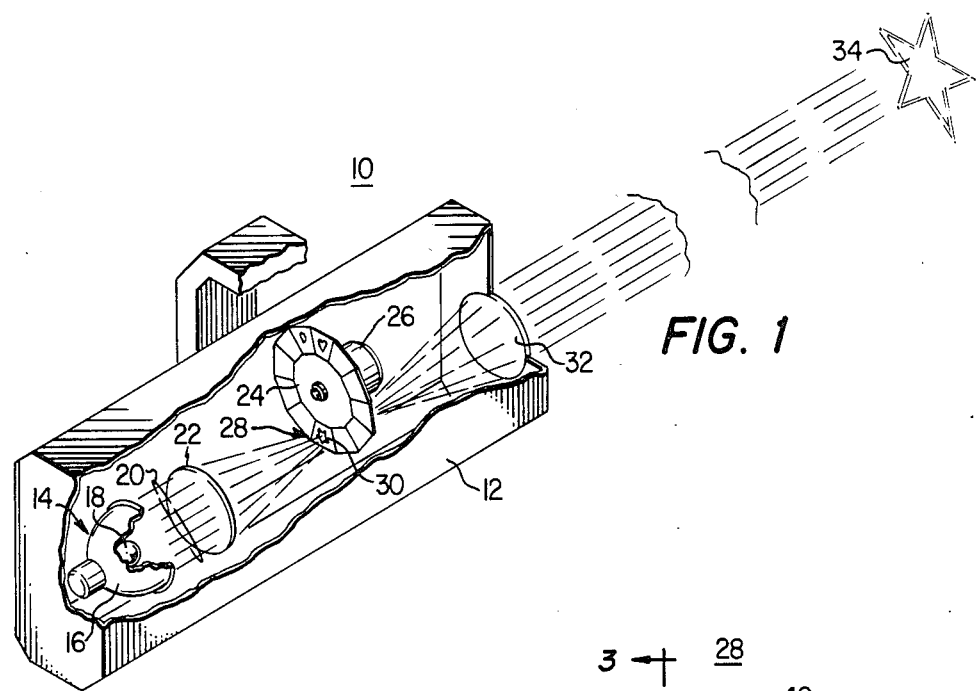
FIG. 1
FIG. 2
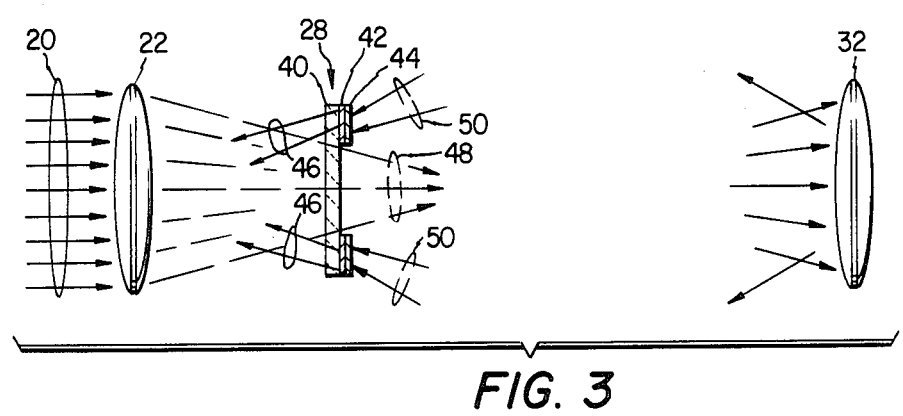
FIG. 3

LIGHT PATTERN GENERATOR

TECHNICAL FIELD

The present invention pertains in general to stage lighting and in particular to such lighting which involves the projection of a silhouette of an image on a stage, screen or backdrop.

BACKGROUND OF THE INVENTION

There are many aspects to providing stage lighting. These include spotlights, flood lights, colors and moving lights. A significant aspect of such stage lighting is the projection of images, in the form of a silhouette, onto the stage to a backdrop, a screen or the performers themselves. The conventional light pattern generator for projecting such a silhouette image is termed a "gobo". The typical gobo is made of a sheet of metal which has the desired image cut in the sheet as an opening for shaping a light beam. The metal sheet, with the cut-out image, is placed in the beam from a spotlight so that the portion of the beam that passes through the sheet is shaped to correspond to the image cut in the gobo. The image is typically passed through a lens so that the image can be focused on a desired portion of the stage.

The gobo is mounted directly in the beam of light. Since stage lighting uses intense light beams, the gobo can become very hot. In fact, it is not unusual for a gobo to become so hot that it begins to glow with a cherry red color. To combat the extremely high heat, gobos have been fabricated of heat resistant metals, such as stainless steel. However, even gobos made of this material have a relative short lifetime and require frequent replacement.

The conventional gobo is also limited as to the configurations that can be produced. Since all of the metal elements of a gobo must be supported, there must often be unwanted support members included in the design. As an example, it is impossible to produce a complete ring design because support members must extend from the exterior to support the interior metal.

Therefore, in view of the need for the projection of images as a part of stage lighting and the short lifetime of conventional gobo image producers, as well as the limitations on designs, there exists a need for an improved light pattern generator which can project a desired image, while at the same time withstanding the high temperatures present within a light fixture.

SUMMARY OF THE INVENTION

A selected embodiment of the present invention comprises a light pattern generator for producing an image in a light beam. The generator includes a transparent plate for placement in the light beam. A light reflective layer is bonded to a surface of the plate with the reflective layer having an opening which is in the shape of the image. A portion of the light beam passes through the opening to produce a beam having the shape of the image. The reflective layer serves to reflect a portion of the light beam which does not pass through the opening.

A further aspect of the present invention comprises the addition of a nonreflective layer to the opposite side of the reflective layer from the source of light. The nonreflective layer likewise has an opening corresponding to the shape of the image. The openings in the two layers are aligned. The nonreflective layer serves to absorb any extraneous light, such as light reflected from the lens that serves to focus the shaped beam.

A still further aspect of the present invention comprises a lighting fixture which includes a light source, a transparent plate having a reflective surface and a lens for focusing a beam. The reflective surface is provided with an opening for passing a portion of the light beam through the opening to produce a beam having the shape of the desired image. The reflecting layer serves to reflect unwanted light from the beam away from the plate. The resulting image produced by the beam is focused by the lens.

BRIEF DESCRIPTION OF THE DRAWINGS

For a complete understanding of the present invention and the advantages thereof, reference is now made to the following Detailed Description taken in conjunction with the accompanying Drawings, in which:

FIG. 1 is a perspective illustration of a lamp fixture having a light source, a light pattern generator and a lens for producing a beam having a desired image shape, FIG. 2 is a light pattern generator, as shown in FIG. 1, which has a desired image formed by layers on the surface thereof, and FIG. 3 is a sectional view of the light pattern generator shown in FIG. 2 together with ray lines which illustrate the transmission, reflection and absorption of light by the light pattern generator.

DETAILED DESCRIPTION OF THE INVENTION

Referring now to FIG. 1, there is illustrated a light fixture 10 which can be used for the purpose of stage lighting. The fixture 10 has a housing 12 which serves to support and enclose the components of the fixture. Within the housing 12, the fixture 10 has a light assembly 14 which comprises a reflector 16 and a bulb 18. This assembly produces a collimated light beam 20 which is transmitted to a lens 22 which serves to focus the beam.

A pattern wheel 24 is mounted for rotation by a stepper motor 26. Around the periphery of the pattern wheel 24 there are provided a plurality of light pattern generators, such as 28. In the disclosed embodiment each of the generators 28 has a trapezoidal shape to form, as a group, a concentric ring about the periphery of the pattern wheel 24. The details of the pattern wheel 24 are further described in copending application Ser. No. 863,440 filed May 15, 1986 by James W. Bornhorst. The generator 28 is provided with a transparent opening 30 which is in the shape of a desired image that is to be projected toward the stage. The pattern wheel 24 can be provided with a plurality of light pattern generators, such as 28 and it can be provided with color filters for producing different colors for the light beam produced by the fixture 10. Any one of the desired images or colors can be rotated by the motor 26 such that the appropriate color filter or light pattern generator is positioned within the light beam.

The light beam is focused by the lens 22 such that it is sufficiently small to pass through the light pattern generator 28. The beam then expands and is passed through a lens 32. The lens 32 serves to provide focusing for the beam and makes the beam essentially colinear. If necessary, the lens 32 can be moved forward or backward in the fixture 10 to focus the image produced by the beam at any desired distance.

The light beam which passes through the lens 32 is directed onto a stage to produce an image 34 which is in the shape of the opening 30 in the light pattern generator 28. The disclosed embodiment shows the opening 30 to be in the shape of a 5-point star which in turn produces an image 34 which has a corresponding star shape.

The light pattern generator 28 is further illustrated in FIGS. 2 and 3. As noted above, the generator 28 has a trapezoidal shape so that a plurality of such generators, and corresponding color filters, can be placed edge to edge about the periphery of a pattern wheel 24 so that there is neither blocking of light nor the escape of white light between adjacent pattern generators or color filters. The pattern generator 28 comprises a transparent plate 40 which has bonded to one surface a reflective layer 42, which is positioned on the surface of the pattern generator 28 opposite from the light assembly 14. The reflective layer 42 has a mirror finish for reflecting light which strikes the layer. Facing in the direction opposite from the mirror surface of the reflective layer 42 there is provided a nonreflective layer 44 which serves to absorb light which strikes the layer. The layers 42 and 44 are provided with the opening 30 which is in the shape of the desired image. The opening 30 extends through the layers 42 and 44, but does not extend through the transparent plate 40.

The light pattern generator 28 is shown in a section view in FIG. 3. The lenses 22 and 32 are further shown in FIG. 3 together with various light rays which illustrate the transmission, reflection and absorption of the various portions of the light beam 20 which is produced by the light assembly 14. As noted above, the light pattern generator 28 comprises a transparent plate 40 which has a reflective layer 42 bonded to the surface thereof on the opposite side from the lens 18. The surface of the layer 42 facing the lens 18 is a mirror surface which reflects the light that strikes the surface. The layer 44 is bonded to the surface of the layer 42 and has an exposed surface which faces the lens 32. The exposed surface of the layer 44 is light absorbent and is therefore nonreflective. The opening 30 extends through both of the layers 42 and 44 and permits light to pass unimpeded through the generator 28. The beam which passes through the light generator 28 is conformed to the shape of the opening 30.

The light pattern generator shown in FIG. 2 has a trapezoidal shape. For the disclosed embodiment, the base length is 0.8 inch, the sides are 1.5 inches and the top is 1.75 inches. The plate 40 has a preferred thickness of 0.04 inch.

Operation of the light pattern generator 28 is now further described in reference to FIG. 3. The light beam 20 is focused to a smaller diameter by the lens 22 at the region of the light pattern generator 28. Portions 46 of the light beam 20 are reflected by the mirror surface of layer 42 away from the pattern generator 28. Portion 48 of light beam 20 passes through the opening 30 and is in the shape of the opening 30. The portion 48 of the beam 20 is directed to the lens 32 and refocused to be an essentially collimated beam which produces the image 34 at the desired location on the stage. Portions 50 of the light beam 20 are reflected back from the lens 32 as well as from the interior surfaces of the housing 12. The portions 50 which strike the nonreflective layer 44 are absorbed in the surface of layer 44. Should the portions 50 be allowed to reflect back from the light pattern generator 28 into the lens 32, these portions of light would produce spurious images would interfere with the desired image 34. Therefore, the light reflected within the housing between the light pattern generator 28 and 32 is absorbed at the surface of layer 44 to prevent the directing of any interferring light rays through the lens 32 toward the image 34. Should any portion of the extraneous light between the light pattern generator 28 and the lens 32 be directed through the opening 30, it will be either dissipated in the housing 12 or redirected through the opening 30 in the correct shape of the beam.

The method of manufacturing the light pattern generator 28 is now described in reference to FIG. 3. The process begins with a large sheet of the transparent plate 40. The plate 40 is preferably made of PYREX glass with a thickness of 0.04 inch. On one surface of the plate 40 there is deposited a layer of positive photo resist which is in the shape of the desired image. On the surface of the plate and the photo resist layer there is then deposited a layer of aluminum having a thickness of approximately 2,000 Angstroms. There is then deposited on the surface of the aluminum a multilayer dielectric coating which comprises a plurality of layers which together have a thickness of approximately 2,000 Angstroms. The multilayer dielectric coating consists of alternating high and low index of refraction materials which form an interference filter that functions as a "black mirror", which is a nonreflective surface that absorbs light. Examples of materials that have the high and low indexes of refraction are magnesium flouride and zinc sulfide. The plate with the various coatings is then exposed to acetone which dissolves the photo resist and lifts all the layers of material which were deposited immediately over the photo resist. The acetone has no effect on the glass. As a result, there is produced an opening through the deposited layers which is in the desired shape of the image.

This process is carried out concurrently on a large sheet of the material which comprises plate 40. Lines are scribed across the glass sheet which includes the plate 40. The sheet is then broken along the scribed lines to produce the individual light pattern generators, such as generator 28.

In the preferred embodiment of the present invention, the layers 42 and 44 are on the same side of the plate 40. However, it would be equally functional to have the layers on opposite sides of the plate 40, but this would require each layer to be etched separately.

In operation, the light pattern generator 28 passes a portion of the light beam 20 to produce the desired image. The reflective layer 42 reflects in excess of 95% of the light that strikes the layer thereby preventing most of the light from being absorbed by the light pattern generator 28, which would otherwise tend to create heat. The light fixture 10 is provided with air ventilation, not shown, which cools the generator 28. The relatively low amount of heat absorbed by the generator 28 permits it to be cooled by forced air cooling. By keeping the generator 28 at a relatively low temperature, it has a much greater lifetime than the conventional metal design for gobos. The layer 44 serves to absorb light, but the amount of this secondary reflected light is quite small and therefore the actual heat which is generated by the absorption of light by layer 44 is very small.

A further advantage of the present invention is that any desired image shape can be produced without the limitation of support members for holding interior light blocking members in place.

A still further advantage of the light pattern generator 28, as compared to conventional gobos, is that the generator 28 is quite small and can be easily fitted on the wheel 24 to produce a large number of image shapes in a very compact space.

In summary, the present invention comprises a light pattern generator which has a mirror surface that is etched to permit the desired shape of beam to be passed through the generator but which reflects the remainder of the light beam to prevent heat buildup in the light pattern generator itself.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

I claim:

1. A light pattern generator for producing an image in a light beam, comprising:
   a transparent plate for placement in said light beam, and
   a light reflective layer bonded to a surface of said plate, said reflective layer having an opening in the shape of said image for passing a portion of said light beam therethrough to produce a beam in the shape of said image, said reflective layer for reflecting a portion of said light beam which does not pass through said opening.

2. A light pattern generator as recited in claim 1 including a nonreflective layer supported by said plate and having an opening therein corresponding to said opening in said reflective layer, said nonreflective layer facing away from said light beam.

3. A light pattern generator as recited in claim 2 wherein said plate is heat resistant glass, said reflective layer is aluminum and said nonreflective layer is a multilayer dielectric coating.

4. A light pattern generator as recited in claim 2 wherein said nonreflective layer is bonded to a surface of said reflective layer.

5. A light pattern generator as recited in claim 4 wherein said layers are positioned on a surface of said plate opposite from a surface of said plate which receives said light beam.

6. A light pattern generator for producing an image in a light beam, comprising:
   a transparent plate for transverse placement in said light beam,
   a light reflective layer bonded to said plate, said reflective layer having an opening in the shape of said image,
   a nonreflective layer bonded to said plate, said nonreflective layer having an opening in the shape of said image and matched to the opening in said reflective layer, and
   said openings for passing a portion of a light beam therethrough to produce a beam in the shape of said image, said reflective layer for reflecting a portion of said light beam which does not pass through said openings, said nonreflective layer for absorbing extraneous light which strikes said nonreflective layer.

7. A light pattern generator as recited in claim 6 wherein said nonreflective layer is bonded to the surface of said reflective layer.

8. A light pattern generator as recited in claim 6 wherein said plate is heat resistant glass, said reflective layer is aluminum and said nonreflective layer is a multilayer dielectric coating.

9. A lamp fixture for producing a light image, comprising:
   a housing,
   means mounted within said housing for producing a light beam,
   a transparent plate located within said housing for transverse placement in said light beam,
   a light reflective layer bonded to a surface of said plate opposite from said means for producing a light beam,
   a nonreflective layer bonded to the surface of said reflective layer, and
   said layers having a common opening therein in the shape of said image wherein a portion of said light beam passes through said opening to produce a beam in the shape of said image, said light reflective layer for reflecting the portion of said light beam which does not pass through said opening, said nonreflective layer for absorbing extraneous light received at the surface thereof, such as light in said beam which is reflected by a lens.

10. A lamp fixture as recited in claim 9, wherein said reflective layer reflects at least 95% of the light which strike said reflective layer.

11. A lamp fixture as recited in claim 9 wherein said plate is heat resistant glass, said reflective layer is aluminum and said nonreflective layer is a multilayer dielectric coating.

12. A lamp fixture for producing a light image, comprising:
   a housing,
   means mounted within said housing for producing a light beam,
   a transparent plate located within said housing and placed transversely in said light beam,
   a light reflective layer bonded to a surface of said plate, said reflective layer having an opening in the shape of said image for passing a portion of said light therethrough to produce a beam in the shape of said image, said reflective layer for reflecting the portion of said light beam not used to produced said image, and
   a lens mounted in said housing on the opposite side of said plate from said means for producing a light beam, said lens for focusing said beam which has passed through said opening in said layer and is in the shape of said image.

13. A lamp fixture as recited in claim 12 wherein said transparent plate has a nonreflective layer facing said lens for absorbing extraneous light, said nonreflective layer having an opening therein which matches the opening in said reflective layer.

14. A lamp fixture as recited in claim 13 wherein said nonreflective layer is positioned on the surface of said reflective layer.

15. A lamp fixture as recited in claim 13 wherein said plate is heat resistant glass, said reflective layer is aluminum and said nonreflective layer is a multilayer dielectric coating.

* * * * *

REEXAMINATION CERTIFICATE (1540th)
United States Patent [19]

Bornhorst

[11] B1 4,779,176

[45] Certificate Issued    Aug. 27, 1991

[54] LIGHT PATTERN GENERATOR

[75] Inventor: James M. Bornhorst, Duncanville, Tex.

[73] Assignee: Vari-Lite Inc.

Reexamination Request:
No. 90/002,081, Jun. 29, 1990

Reexamination Certificate for:
Patent No.: 4,779,176
Issued: Oct. 18, 1988
Appl. No.: 887,368
Filed: Jul. 16, 1986

[51] Int. Cl.$^5$ .................... F21P 5/00; G03B 23/00
[52] U.S. Cl. ................................. 362/223; 362/222; 362/307; 353/62; 353/84; 353/42; 40/560

[56] References Cited

U.S. PATENT DOCUMENTS 2,379,534   7/1945   Lowden ............................. 88/24

OTHER PUBLICATIONS

"Designing Slides for Theater and Concert Projection", Andrea Tawil, *Theatre Crafts*, Mar. 1982.

"The Scene Machine" product brochure of The Great American Market, 1981.

"Optics Guide 2", Melles Griot, Antireflection Coatings, pp. 71–78, 1981.

"Optics Guide 3", Melles Griot, Chapter 4, pp. 69–89, Optical Coatings, 1985.

*Primary Examiner*—Larry Jones
*Attorney, Agent, or Firm*—Morgan & Finnegan

[57] ABSTRACT

A light pattern generator is utilized to produce an image which is projected onto a stage or screen. The image is derived from a beam of light. The light pattern generator comprises a heat resistant glass plate having a reflective layer deposited on one surface thereof. A nonreflective layer is deposited on the surface of the reflective layer. Both of the layers are etched to produce an opening extending through the layers wherein the opening has the shape of the desired image. The beam of light is directed through the transparent plate and the portions not passed through the opening are reflected by the mirror surface of the reflective layer. This prevents the buildup of heat within the light pattern generator. Any extraneous light which is received at the nonreflective layer is absorbed to prevent the escape of unwanted light and its projection to the stage.

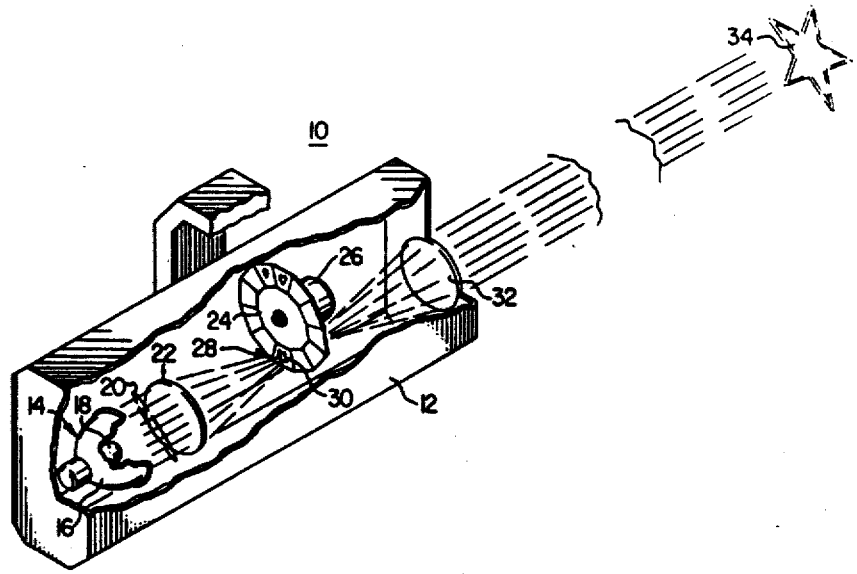

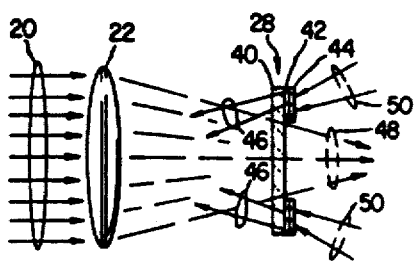 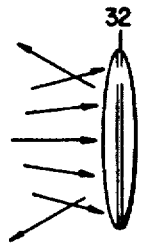

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 9, 12 are determined to be patentable as amended.

Claims 2-5, 7, 8, 10, 11, 13-15, dependent on an amended claim, are determined to be patentable.

New claims 16-26 are added and determined to be patentable.

1. A light pattern generator for producing an image in a light beam *having a potentially damaging infrared portion*, comprising:
   a transparent plate for placement in said light beam, and
   *means having an opening in the shape of said image for reflecting a portion of said light beam which does not pass through said opening including a sufficient amount of the infrared portion of the light beam to prevent excessive heat build up in said light pattern generator, said means including* a [light] reflective layer [bonded to a surface of said plate, said reflective layer] having [an] *said* opening in the shape of said image for passing a portion of said light beam therethrough to produce a beam in the shape of said image [, said reflective layer for reflecting a portion of said light beam which does not pass through said opening].

6. A light pattern generator for producing an image in a light beam *having a potentially damaging infrared portion*, comprising:
   a transparent plate for transverse placement in said light beam;
   *means having an opening in the shape of said image for reflecting a portion of said light beam which does not pass through said opening including a sufficient amount of the infrared portion of the light beam to prevent excessive heat build up in said light pattern generator, said means including* a [light] reflective layer bonded to said plate, said reflective layer having [an] *said* opening in the shape of said image;
   a nonreflective layer bonded to said plate, said nonreflective layer having an opening in the shape of said image and matched to the opening in said reflective layer; and
   said openings for passing a portion of [a] *said* light beam therethrough to produce a beam in the shape of said image, [said reflective layer for reflecting a portion of said light beam which does not pass through said openings] said nonreflective layer [for] *being capable of* absorbing extraneous light *reflected from downstream of said light pattern generator* which strikes said nonreflective layer.

9. A lamp fixture for producing a light image, comprising:
   a housing,
   means mounted within said housing for producing a light beam *having a potentially damaging infrared portion, and*
   *a light pattern generator comprising:*
   a transparent plate located within said housing for transverse placement in said light beam,
   *means having an opening in the shape of said image for reflecting a portion of said light beam which does not pass through said opening including a sufficient amount of the infrared portion of the light beam to prevent excessive heat buildup in said light pattern generator, said means including* a [light] reflective layer bonded to a surface of said plate opposite from said means for producing a light beam,
   a nonreflective layer bonded to the surface of said reflective layer, and
   said layers having a common opening therein in the shape of said image wherein a portion of said light beam passes through said openings to produce a beam in the shape of said image. [said light reflective layer for reflecting the portion of said light beam which does not pass through said opening], said nonreflective layer [for] *being capable of* absorbing extraneous light received at the surface thereof *from downstream of said light pattern generator*, such as light in said beam which is reflected by a lens.

12. A lamp fixture for producing a light image, comprising:
   a housing,
   means mounted within said housing for producing a light beam, *having a potentially damaging infrared portion, and*
   *a light pattern generator comprising:*
   a transparent plate located within said housing and placed transversely in said light beam,
   *means having an opening in the shape of said image for reflecting a portion of said light beam which does not pass through said opening including a sufficient amount of the infrared portion of the light beam to prevent excessive heat build up in said light pattern generator, said means including* a [light] reflective layer bonded to a surface of said plate, said reflective layer having [an] *said* opening in the shape of said image for passing a portion of said light *beam* therethrough to produce a beam in the shape of said image, [said reflective layer for reflecting the portion of said light beam not used to produced said image,] and
   a lens mounted in said housing on the opposite side of said plate from said means for producing a light beam, said lens for focusing said beam which has passed through said opening in said layer and is in the shape of said image.

*16. A light pattern generator in combination with a light beam generating source to produce an image in said light beam comprising:*
   *a transparent plate for placement in said light beam; and*
   *a light reflective layer bonded to a surface of said plate, said reflective layer having an opening in the shape of said image for passing a portion of said light beam therethrough to produce a beam in the shape of said image, said reflective layer being positioned such that* the reflective layer faces the light beam generating source, said reflective layer being capable of reflecting a portion of said light beam which does not pass through said opening.

17. A light pattern generator according to claim 16, further including a nonreflective layer supported by said plate and having an opening therein corresponding to said opening in said reflective layer, said nonreflective layer being exposable to light reflected from downstream of said light pattern generator and being capable of absorbing such downstream light which strikes said nonreflective layer.

18. A light pattern generator according to claim 17, wherein said nonreflective layer comprises a multilayer dielectric coating having varying high and low index of refraction materials.

19. A light pattern generator according to claim 16, wherein said reflective layer has a mirror finish exposable to said light beam.

20. A light pattern generator in combination with a light beam generating source for producing an image in a light beam comprising:
 a transparent plate for placement in said light beam;
 a reflective layer bonded to a surface of said plate so as to be exposable to said light beam, said reflective layer having an opening in the shape of said image for passing a portion of said light beam therethrough to produce light in the shape of said image, said reflective layer being positioned such that the reflective layer faces the light beam generating source, said reflective layer being capable of reflecting a portion of said light beam which does not pass through said opening; and
 a nonreflective layer disposed on the opposite surface of said plate bonded with said reflective layer and being exposable to light from downstream of the light pattern generator, said nonreflective layer having an opening corresponding to the opening in said reflective layer, said nonreflective layer being capable of absorbing said light from downstream of the light pattern generator.

21. A lamp fixture for producing a light image, comprising:
 a housing;
 means mounted within said housing for producing a light beam;
 a pattern wheel rotatably mounted in the path of said light beam for rotatably placing one of a plurality of light image generators in the path of said light beam, each of said light image generators comprising:
 a transparent plate;
 a light reflective layer bonded to a surface of said plate so as to be exposable to said means for producing a light beam, said layer having an opening therein in the shape of said image wherein a portion of said light beam passes through said opening to produce light in the shape of said image, said light reflective layer being capable of reflecting the portion of said light beam which does not pass through said opening.

22. A lighting fixture according to claim 21, wherein each of said light image generators further includes a nonreflective layer bonded to said plate and having an opening therein corresponding to said opening in said reflective layer, said nonreflective layer being exposable to light from downstream of the light image generator and being capable of absorbing such downstream light which strikes said nonreflective layer.

23. A lighting fixture according to claim 22, wherein said nonreflective layer comprises a multilayer dielectric coating having varying high and low index of refraction materials.

24. A lighting fixture according to claim 21, wherein each of said light image generators is capable of placement edge to edge about the periphery of said pattern wheel such that there is neither blocking of light nor the escape of white light between adjacent image generators.

25. A lighting fixture according to claim 21, wherein each of said light image generators has a trapezoidal shape.

26. A light pattern generator comprising:
 a transparent plate having opposed surfaces;
 means for reflecting a sufficient amount of potentially damaging infrared energy from a light beam incident thereon to prevent excessive heat buildup in said generator, said means including a reflective layer being bonded to one surface of said transparent plate and having an opening in the shape of a desired image; and
 a non-reflective layer for absorbing light incident thereon, said non-reflective layer being bonded to the other surface of said transparent plate and having an opening corresponding to the opening in said reflective layer.

* * * * *